(No Model.)

A. M. HOWARD.
VEHICLE WHEEL.

No. 562,224.　　　　　　Patented June 16, 1896.

Witnesses
J. F. Shumway
F. W. Peck

Anson M. Howard,
Inventor
By Attys Earle Seymour

UNITED STATES PATENT OFFICE.

ANSON M. HOWARD, OF NEW HAVEN, CONNECTICUT.

VEHICLE-WHEEL.

SPECIFICATION forming part of Letters Patent No. 562,224, dated June 16, 1896.

Application filed November 25, 1895. Serial No. 570,050. (No model.)

*To all whom it may concern:*

Be it known that I, ANSON M. HOWARD, of New Haven, in the county of New Haven and State of Connecticut, have invented a new Improvement in Wheels; and I do hereby declare the following, when taken in connection with the accompanying drawings and the letters of reference marked thereon, to be a full, clear, and exact description of the same, and which said drawings constitute part of this specification, and represent, in—

Figure 1:
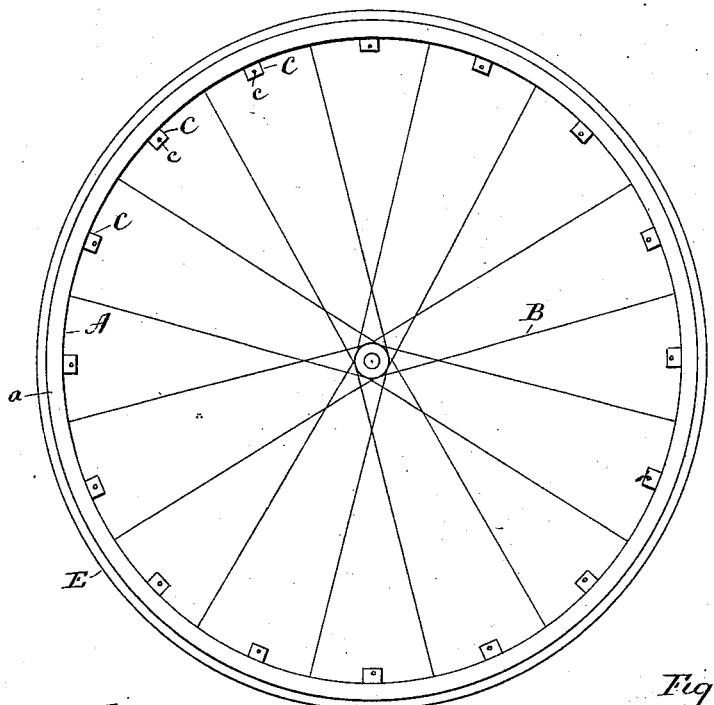
Figure 2:
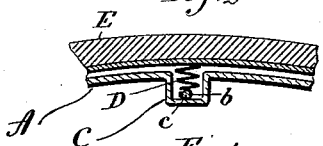
Figure 6:
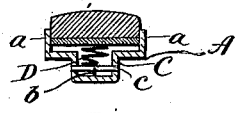
Figure 3:
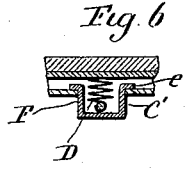
Figures 4, 5:
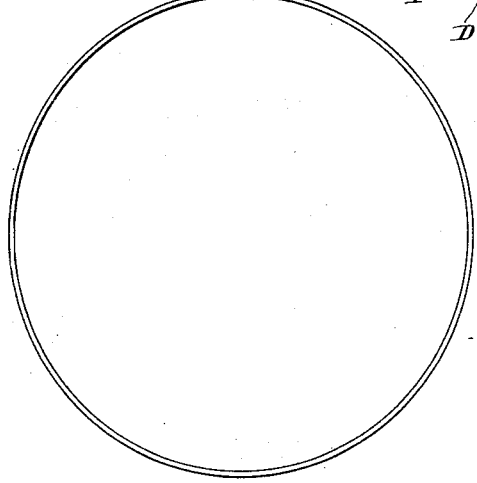

Figure 1, a side view; Fig. 2, a vertical section of a portion of the segment of the rim and one of the sockets; Fig. 3, a transverse vertical section of the rim and one of the sockets; Fig. 4, a side view of the spring-ring detached; Fig. 5, a side view of the cushion-tire; Fig. 6, a modification.

This invention relates to an improvement in vehicle-wheels, and particularly to that class which are provided with cushion-tires, although equally applicable to receive pneumatic tires, the object of the invention being a strong wheel and a large amount of cushioning action; and it consists in the construction as hereinafter described, and particularly recited in the claims.

A represents the rim, the sides $a$ of which extend outward parallel with each other, and substantially at a right angle to the body, and B spokes secured to the rim in any of the well-known methods. In the body of the rim and between each of the spokes is a cup-shaped socket C, preferably struck from metal, forming the rim. In each socket a coiled spring D is arranged, each spring being formed with an eye $b$ at its lower end, through which a pin $c$ may extend, the said pin also extending through perforations in the sockets, whereby the spring is securely held in position, its upper end extending above the outer face of the body of the rim. The tire consists of a strip of spring-steel, of a diameter slightly larger than the diameter of the body of the rim, and slightly smaller than the diameter of the flanges, and so that when placed in position it will stand between the flanges $a$ and be held in position thereby and have a bearing on each of the springs D. The tire is placed in position by springing the rim inward at one point and so as to contract the same, permitting the tire to pass over the flanges $a$, after which the rim is returned to its normal position. To this spring-tire rubber or other cushioning material E, either solid or pneumatic, is applied, the edges of which, bearing against the flanges $a$ of the rim, form a tight packing to prevent dirt entering between them.

Instead of forming the cups or sockets integral with the rim, they may be formed independently, as seen in Fig. 6, and consist of cups C', formed with flanges $e$, which take a bearing around openings F, formed in the rim, the coiled springs D being secured to these cups in the manner before described.

In a wheel thus constructed not only is the cushioning effect of the tire itself obtained, but also the benefit of springs between the tire and rim.

I am aware that springs have been arranged between tires and rims, and do not therefore wish to be understood as claiming, broadly, such as my invention; but What I do claim is—

1. A vehicle-wheel comprising a rim formed with outwardly-extending flanges on each edge, and sockets extending inwardly from said rim between the spokes of the wheel, and a tire having a continuous spring-ring located between the flanges of the rim, and springs secured in the said sockets and supporting the ring within the rim, substantially as described.

2. A vehicle-wheel comprising a rim formed with outwardly-extending flanges on each edge, and sockets formed integral with said rim and extending inwardly from said rim between the spokes of the wheel, and a tire having a continuous spring-ring located between the flanges of the rim, and springs secured in the said sockets and supporting the ring within the rim, substantially as described.

In testimony whereof I have signed this specification in the presence of two subscribing witnesses.

ANSON M. HOWARD.

Witnesses:
FRED. C. EARLE,
J. H. SHUMWAY.